(12) United States Patent
Tanaka et al.

(10) Patent No.: US 12,203,234 B2
(45) Date of Patent: Jan. 21, 2025

(54) CONSTRUCTION MACHINE

(71) Applicant: KOBELCO CONSTRUCTION MACHINERY CO., LTD., Hiroshima (JP)

(72) Inventors: Hiroki Tanaka, Hiroshima (JP); Shigeki Kuramoto, Hiroshima (JP); Ichiro Wada, Hiroshima (JP); Yukio Miyano, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 483 days.

(21) Appl. No.: 17/610,848

(22) PCT Filed: May 18, 2020

(86) PCT No.: PCT/JP2020/019620
§ 371 (c)(1),
(2) Date: Nov. 12, 2021

(87) PCT Pub. No.: WO2020/241349
PCT Pub. Date: Dec. 3, 2020

(65) Prior Publication Data
US 2022/0307220 A1 Sep. 29, 2022

(30) Foreign Application Priority Data
May 28, 2019 (JP) .................................. 2019-099114

(51) Int. Cl.
*E02F 3/36* (2006.01)
*E02F 3/38* (2006.01)
*E02F 9/00* (2006.01)

(52) U.S. Cl.
CPC ............ *E02F 3/369* (2013.01); *E02F 3/3636* (2013.01); *E02F 3/365* (2013.01); *E02F 3/3668* (2013.01);
(Continued)

(58) Field of Classification Search
CPC .............. Y10T 403/595; F16B 2200/69; E02F 3/3636; E02F 3/365; E02F 3/3668; E02F 3/3672
See application file for complete search history.

(56) References Cited

U.S. PATENT DOCUMENTS 3,396,863 A * 8/1968 Borer ...................... E02F 3/388
414/713
5,692,855 A * 12/1997 Burton .................. E02F 3/3668
37/906
(Continued)

FOREIGN PATENT DOCUMENTS

EP 2 581 500 A1 4/2013
EP 2 055 842 * 12/2016 ............ E02F 3/3627
(Continued)

OTHER PUBLICATIONS

Extended European Search Report issued May 9, 2022, in corresponding European Patent Application No. 20815508.5, 6 pages.
(Continued)

*Primary Examiner* — Michael P Ferguson
(74) *Attorney, Agent, or Firm* — Oblon, McClelland, Maier & Neustadt, L.L.P.

(57) ABSTRACT

A first pinhole is formed in a first member in a section facing a second member. A second pinhole is formed in the second member in a section facing the first member. A connecting pin is inserted into the first pinhole and the second pinhole from the side of the machine center. A coming-off prevention mechanism includes a coming-off prevention lever. The
(Continued)

coming-off prevention lever can abut the inner end surface of the connecting pin. The coming-off prevention lever is supported by the second member to be able to move between an abutting position of abutting the inner end surface of the coupling pin and a non-abutting position of not abutting the inner end surface.

6 Claims, 13 Drawing Sheets

(52) U.S. Cl.
CPC .............. *E02F 3/382* (2013.01); *E02F 9/006* (2013.01); *F16B 2200/69* (2023.08); *Y10T 403/595* (2015.01)

(56) References Cited

U.S. PATENT DOCUMENTS

| | | | | |
|---|---|---|---|---|
| 6,332,732 | B1* | 12/2001 | Mantovani | .............. E02F 3/364 |
| | | | | 172/275 |
| 7,513,732 | B1* | 4/2009 | Callens | ................ E02F 3/3627 |
| | | | | 37/468 |
| 8,684,656 | B2* | 4/2014 | Hilsden | ................. E02F 3/3695 |
| | | | | 414/920 |
| 9,719,228 | B2* | 8/2017 | Kumbhar | .............. A01B 59/002 |
| 2005/0241196 | A1 | 11/2005 | Martinez | |
| 2009/0127218 | A1* | 5/2009 | Hylen | ....................... E02F 3/38 |
| | | | | 212/292 |
| 2011/0280648 | A1 | 11/2011 | Malacrino et al. | |
| 2017/0306587 | A1 | 10/2017 | Hosaka et al. | |

FOREIGN PATENT DOCUMENTS

| | | |
|---|---|---|
| JP | 2010-185243 A | 8/2010 |
| JP | 2011-256961 A | 12/2011 |
| JP | 2013-67967 A | 4/2013 |
| JP | 2017-193878 A | 10/2017 |

OTHER PUBLICATIONS

International Search Report issued on Jul. 28, 2020 in PCT/JP2020/019620 filed May 18, 2020, 2 pages.

\* cited by examiner

CONSTRUCTION MACHINE

TECHNICAL FIELD

The present invention relates to a construction machine and, more particularly, to a construction machine capable of preventing connecting pin connecting two members from coming off against an operator's intention.

BACKGROUND ART

Conventionally, in a construction machine such as a hydraulic shovel, there has been proposed a connecting device for connecting two members rotating each other using a connecting pin (for example, Patent Literature 1). The connecting device described in Patent Literature 1 connects the slewing frame of the hydraulic shovel and the lower boom of the multi-boom to each other.

Specifically, the left boom bracket of the slewing frame and the left boom foot of the lower boom are connected by a left connecting pin, and the right boom bracket of the slewing frame and the right boom foot of the lower boom are connected by a right connecting pin.

A pair of right and left coming-off prevention plates are detachably attached to the front ends of the right and left connecting pins. The left side coming-off prevention plate is secured by a bolt to the tip of the left connecting pin projecting from the left outer boom bracket of the slewing frame with the left boom bracket and the left boom foot connected by the left connecting pin. Similarly, the right side corning-off prevention plate is secured by a bolt to the tip of the right connecting pin projecting from the right outer boom bracket of the slewing frame with the right boom bracket and the right boom foot connected by the right connecting pin.

CITATION LIST

Patent Literature

Patent Literature 1: Japanese Unexamined Patent Publication No. 2011-256961

In the above-described technique, since the left and right connecting pins are prevented from coming off by the right and left coming-off prevention plates attached to the tip (left and right sides) of the right and left connecting pins, there is a problem that when a structure such as a cab exists in the vicinity of the tip of the right and left connecting pins, the workability of the operator for preventing the connecting pin from coming off is poor because the operator cannot sufficiently secure a work space for attaching and detaching the coming-off prevention plate.

SUMMARY OF INVENTION

An object of the present invention is to provide a construction machine having excellent workability for preventing the connecting pin from coming off.

Provided by the present invention is a construction machine, comprising: a first member having a first connecting portion adjacent to a retract space formed in the construction machine, the first connecting portion being formed of a first pin hole opened toward the retract space and penetrating the first connecting portion in a first penetration direction, a second member having a second connecting portion disposed at a position opposite to the retract space across the first connecting portion, the second connecting portion being formed of a second pin hole penetrating the second connecting portion in a second penetration direction at a position aligned with the first pin hole in the first penetration direction, a connecting pin supported by the first member or the second member so as to be movable within a range between a connecting position and a non-connecting position, the connecting position being a position in which the connecting pin is inserted into the first pin hole and the second pin hole to connect the first member and the second member to each other, and the non-connecting position being a position to which the connecting pin moves in a retract direction in which the connecting pin is retracted from the connecting position to the retract space along the first through direction and the second penetration direction to release the connection between the first member and the second member, and a movement prevention mechanism capable of preventing the connecting pin disposed at the connecting position from moving to the non-connecting position in the retract direction, wherein the connecting pin has an abutted surface disposed so as to face the retracting direction, the movement prevention mechanism includes an abutting member having an abutting portion capable of abutting the abutted surface of the connecting pin and is supported by the first member or the second member on the distal end side of the retract direction relative to the second connecting portion so that the abutting portion can move between an abutting position and a non-abutting position, the abutting position being a position in which the abutting portion is disposed so as to face the abutted surface on the tip side in the retracting direction relative to the abutted surface, and the abutting portion abuts on the abutted surface to prevent the connecting pin from moving from the connecting position to the non-connecting position in the retracting direction, and the non-abutting position is a position in which the abutting portion moves in a direction intersecting the retract direction so as to be separated from the abutted surface and allows the connecting pin to move from the connecting position to the non-connecting position.

DESCRIPTION OF EMBODIMENTS

Figure 1:
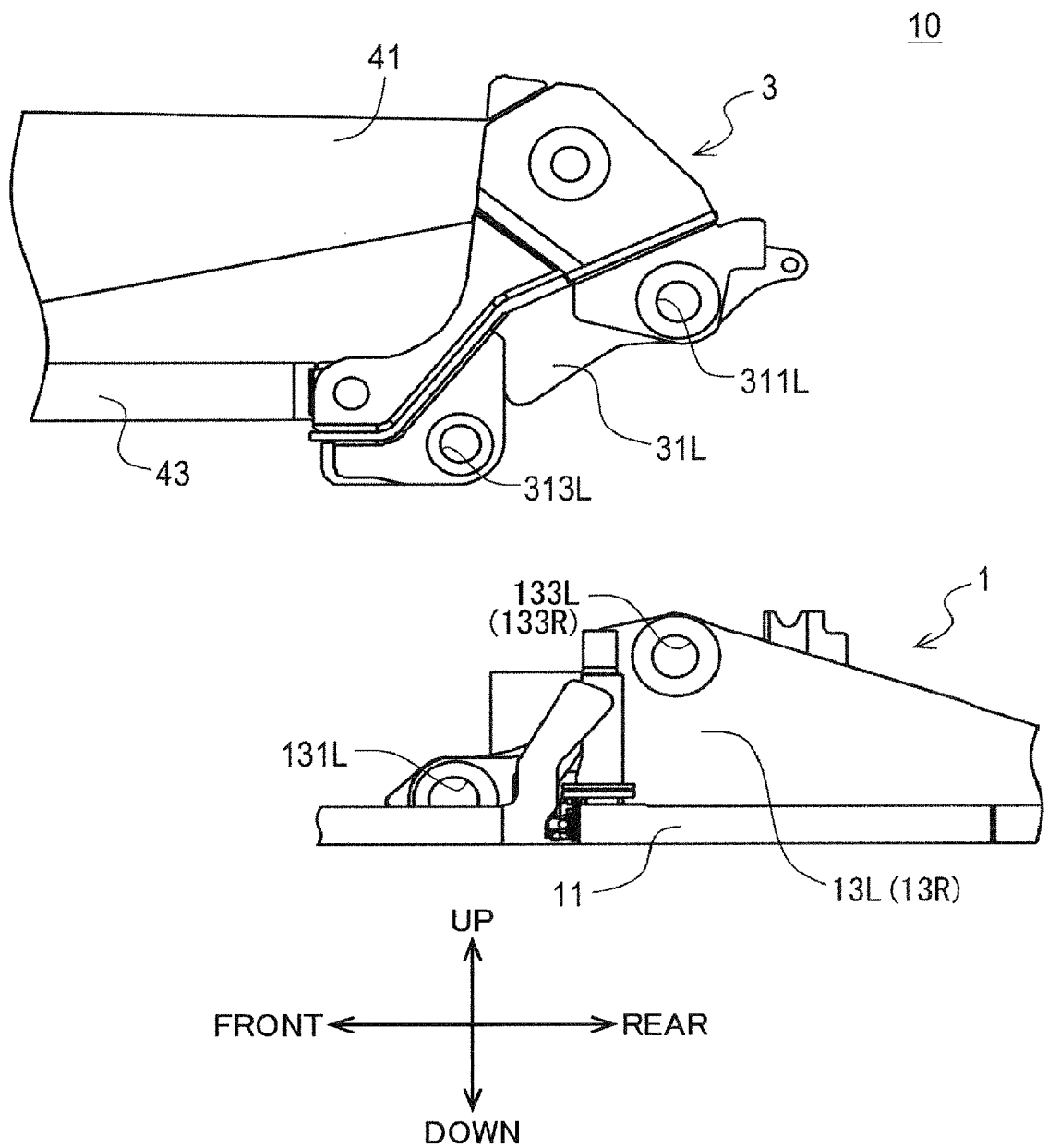
FIG. 1 is an exploded side view showing a state in which a part of a construction machine according to an embodiment of the present invention is disassembled.
Figure 2:
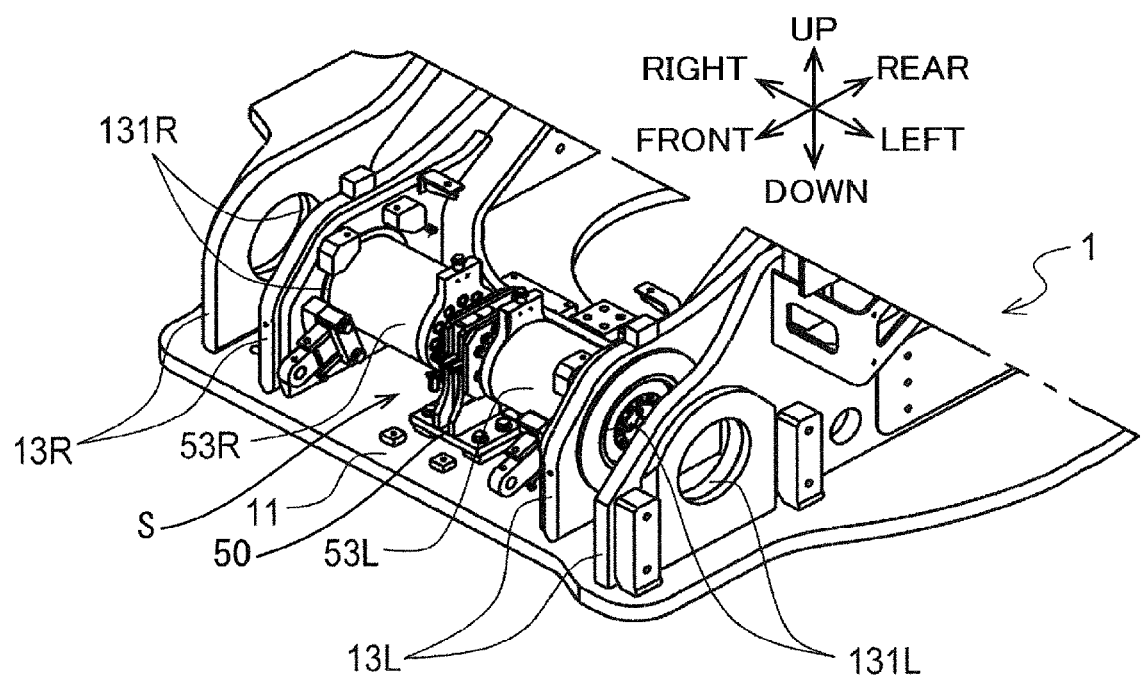
FIG. 2 is a perspective view of a part of an upper frame of the construction machine according to the embodiment of the present invention viewed obliquely upward.
Figure 3:
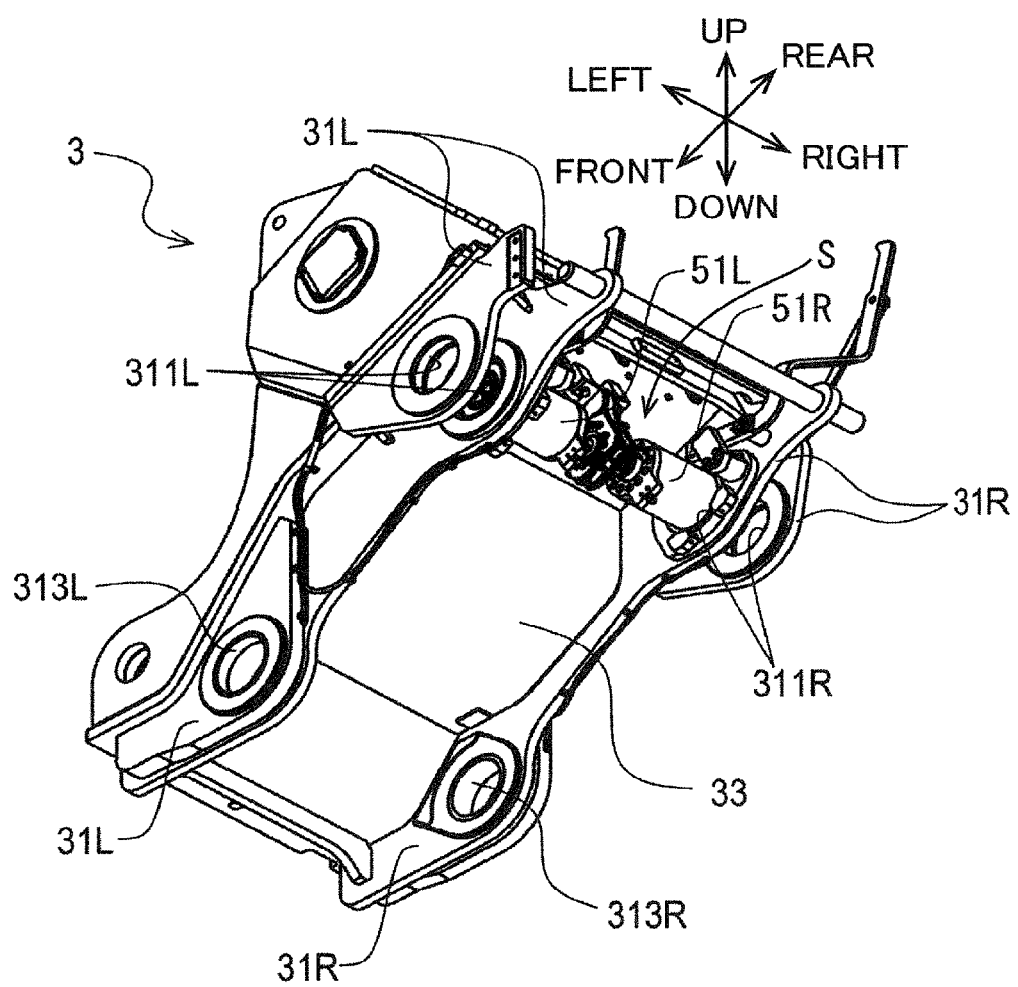
FIG. 3 is a perspective view of a sub-frame of the construction machine according to the embodiment of the present invention viewed obliquely downward.

A connecting pin coming-off prevention structure of a construction machine according to one embodiment of the present invention will be described with reference to FIG. 1 to FIG. 13. A hydraulic shovel 10 (see FIG. 1) is illustrated as an example of a construction machine according to the present invention. As an example of the coming-off prevention structure of the hydraulic pin according to the present invention, a coming-off prevention mechanism 6 (see FIG. 4) and a coming-off prevention mechanism 7 (see FIG. 10) are exemplified. FIG. 1 is an exploded side view showing a state in which a part of the hydraulic shovel 10 according to the present embodiment is disassembled. FIG. 2 is a perspective view showing a part of the upper frame 1 of the hydraulic shovel 10 according to the present embodiment from the left oblique upper side. FIG. 3 is a perspective view of the sub-frame 3 of the hydraulic shovel 10 according to the present embodiment viewed from the left oblique lower side.

Figure 10:
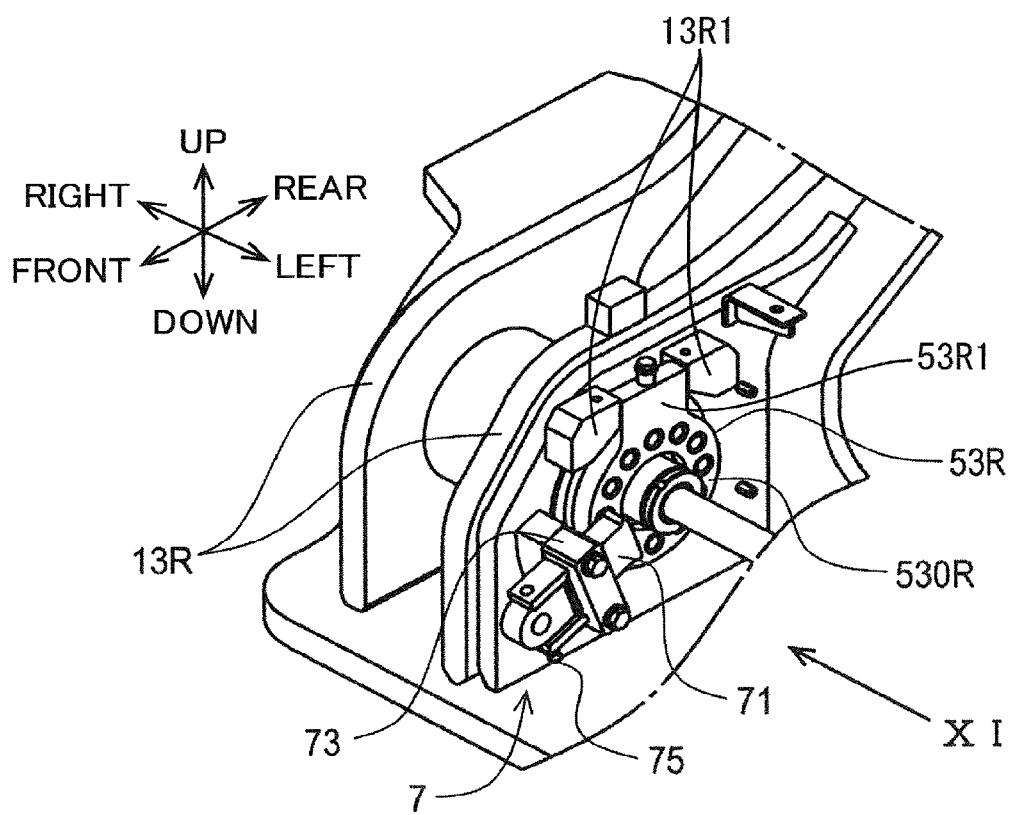
FIG. 10 is a perspective view of a movement prevention mechanism disposed opposite to a front side connecting pin of the construction machine according to the embodiment of the present invention, and showing a state where the abutting member is switched to the abutting position.

As shown in FIG. 1, the hydraulic shovel 10 includes an upper frame 1 (a first member, a second member) as a part of an upper slewing body, a boom 41, a boom cylinder 43, a sub-frame 3 (a first member, a second member), connecting pins 51L, 51R (FIG. 3), connecting pins 53L, 53R (FIG. 2), the coming-off prevention mechanism 6 (FIG. 4), and the coming-off prevention mechanism 7 (FIG. 10).

A work attachment such as a boom 41 and a boom cylinder 43 is mounted on the upper frame 1 via the sub-frame 3. The sub-frame 3 is an adapter for assembling and disassembling in a state where the boom 41 and the boom cylinder 43 are integrated.

As shown in FIGS. 1 and 2, the upper frame 1 has a bottom plate 11 and a pair of right and left vertical plates 13L, 13R erected on the bottom plate 11. The pair of left and right vertical plates 13L, 13R extend in parallel with a machine center line extending in the front-rear direction of the hydraulic shovel 10, and are arranged opposite to each other across a retract space S (space) in the left-right direction (FIG. 2).

As shown in FIG. 2, the front portion (first connecting portion) of the vertical plate 13L is composed of two plate members in which a pair of pin holes 131L (first pin holes) for allowing the connecting pin 53L to be inserted is formed on the same axis in the left-right direction (first through direction), respectively. The pin hole 131L penetrates the vertical plate 13L in the left-right direction. The front portions of the vertical plates 13L (the two plate members) are opposed to each other with a width capable of receiving the front portion of the side plate 31L of the sub-frame 3 shown in FIG. 3 (for details, the portion where the pin hole 313L is formed, the second connecting portion). When the front part of the vertical plate 13L receives the front part of the side plate 31L of the sub-frame 3, these members are arranged opposite to each other in the left-right direction.

Similarly, the front portion (first connecting portion) of the vertical plate 13R is composed of two plate members in which a pair of pin holes 131R (first pin holes) for allowing the connecting pin 53R to be inserted is formed on the same axis in the left-right direction (first through direction), respectively. The pin hole 131R penetrates the vertical plate 13R in the left-right direction. The front portions (the two plate members) of the vertical plates 13R are opposed to each other with a width capable of receiving the front portion (for details, the portion where the pin hole 313R is formed, the second connecting portion) of the side plate 31R of the sub-frame 3. When the front part of the vertical plates 13R receives the front part of the side plate 31R of the sub-frame 3, these members are arranged opposite to each other in the left-right direction.

On the other hand, the central upper portion (the upper end of the central portion in the front-rear direction, the second connecting portion) of the vertical plate 13L of FIG. 1 (similarly the vertical plate 13R) is composed of one plate member. Pin holes 133L and 133R (second pin holes) for allowing the connecting pins 51L, 51R (see FIG. 3) to be inserted are formed in the center upper portion of the vertical plates 13L, 13R along the left-right direction (second penetration direction), respectively. The pin holes 133L and 133R penetrate the vertical plates 13L and 13R in the left-right direction. Although only the pin hole 133L formed in the vertical plate 13L is shown in FIG. 1, a pin hole 133R (second pin hole) is formed on the same axis as the pin hole 133L in the vertical plate 13R on the opposite side, and a reference sign is shown in the parenthesis.

As shown in FIG. 3, the sub-frame 3 has a pair of right and left side plates 31L, 31R and a back plate 33.

Both the front part of the side plate 31L and the front part (second connecting portion) of the side plate 31R are composed of one plate member. In the front portion of the side plate 31L, a pin hole 313L (second pin hole) for allowing the connecting pin 53 L (see FIG. 2) to be inserted (receive the connecting pin 53L) is formed along the left-right direction (second penetration direction). In the front portion of the side plate 31R, a pin hole 313R (second pin hole) for allowing the connecting pin 53R (see FIG. 2) to be inserted (receive the connecting pin 53R) is formed along the left-right direction (second penetration direction). The pin holes 313L and 313R penetrate the side plates 31L and 31R in the left-right direction.

On the other hand, as shown in FIG. 3, the rear portion (first connecting portion) of the left side plate 31L is composed of two plate members each having a pin hole 311 L (first pin hole) formed on the same axis along the left-right direction (first penetration direction) to allow the connecting pin 51L to be inserted therein (receive the connecting pin 51L). The pin hole 311L penetrates the side plate 31L in the left-right direction. The rear portions (two plate members) of the side plates 31L face each other with a width capable of receiving the upper end portion of the center portion (the upper end portion of the center portion in the front-rear direction, and in detail, a portion where the pin hole 133L is formed, the second connecting portion) of the side plate 31L of the upper frame 1 shown in FIG. 1. When the rear portions (two plate members) of the side plates 31L receive the center upper portion of the vertical plate 13L of the upper frame 1, these members are disposed facing each other in the left-right direction.

Similarly, the rear portion (first connecting portion) of the side plate 31R is composed of two plate members each having a pin hole 311R (first pin hole) for allowing the connecting pin 51R to be inserted therein (receive the connecting pin 51R) is formed on the same axis along the left-right direction (first penetration direction). The pin hole 311R penetrates the side plate 31R in the left-right direction. The rear portions (two plate members) of the side plates 31R face each other with a width capable of receiving the upper end portion of the center portion of the side plate 31R of the upper frame 1 (the upper end portion of the center portion in the front-rear direction, in detail, a portion where the pin hole 133R is formed, the second connecting portion). When the rear portions (two plate members) of the side plates 31R receive the center upper portion of the vertical plate 13R of the upper frame 1, these members are disposed facing each other in the left-right direction.

As shown in FIGS. 2 and 3, the vertical plates 13L and 13R and the side plates 31L and 31R extend so as to be orthogonal (intersect) to the left-right direction, and are arranged opposite to the retract space S (space) disposed inside the hydraulic shovel 10 in the left-right direction. That is, the vertical plates 13L and 13R and the side plates 31L and 31R are arranged opposite to each other across the retract space S, and are adjacent to the retract space S, respectively. The pin holes 131L, 131R and the pin holes 311L and 311R are respectively opened toward the retract space S. In the retract space S, connecting pins 51L, 51R and connecting pins 53L, 53R are arranged, respectively.

When the sub-frame 3 is mounted on the upper frame 1, the front part of the side plates 31L, 31R of the sub-frame 3 composed of one plate member is inserted into the front part of the vertical plates 13L, 13R of the upper frame 1 composed of two plate members. In this case, the positions of the pin holes 313L and 313R formed in the front of the side plates 31L and 31R are adjusted so as to be positioned on the same axis as the pin holes 131L and 131R formed in the front of the vertical plates 13L and 13R. In this case, the side plate 31L and the vertical plate 13L, the side plate 31R and the vertical plate 13R are disposed opposite to each other on the opposite side of the retract space S in the left-right direction.

Figure 4:
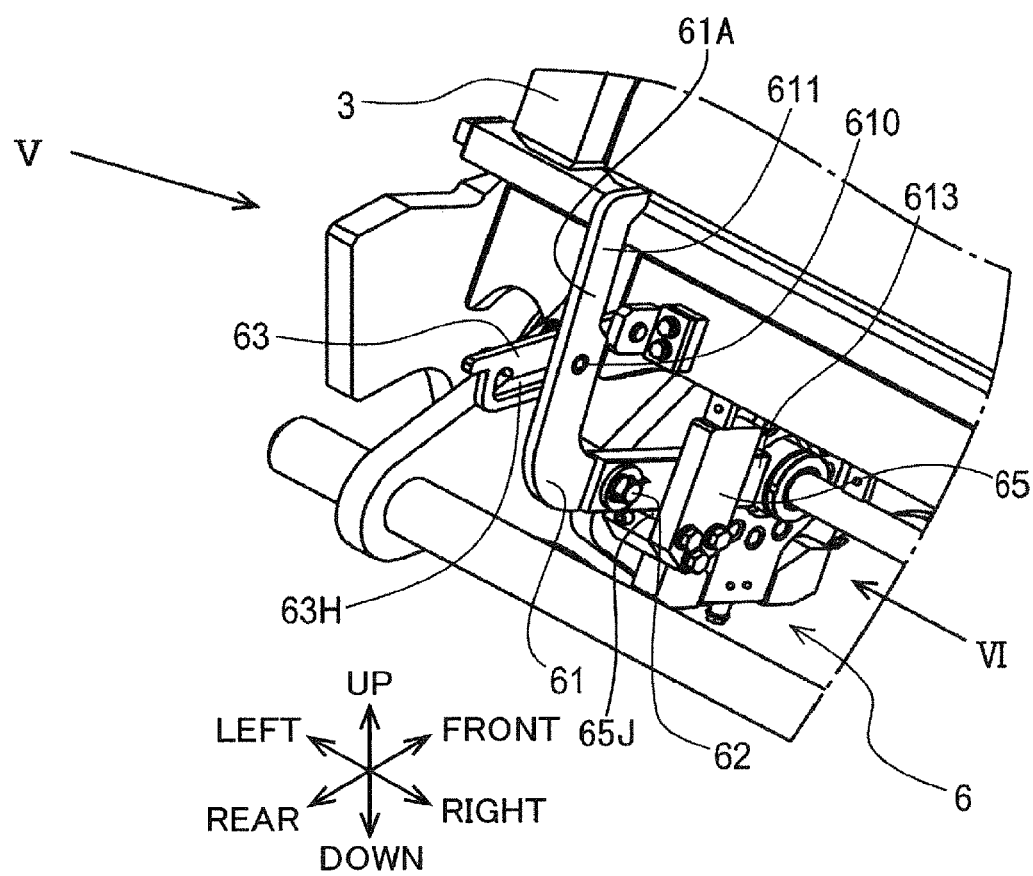
FIG. 4 is a perspective view of a movement prevention mechanism disposed facing a rear side connecting pin of the construction machine according to the embodiment of the present invention.
Figure 5:
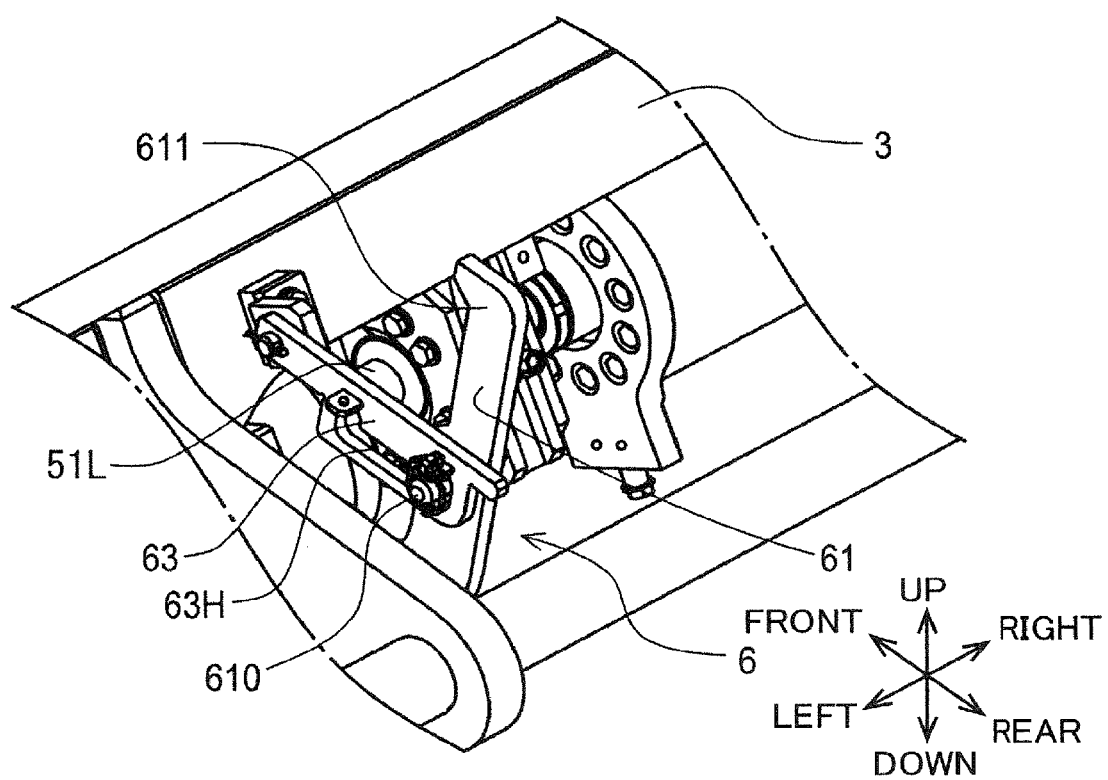
FIG. 5 is a perspective view of the movement prevention mechanism in FIG. 4 viewed along an arrow V.
Figure 6:
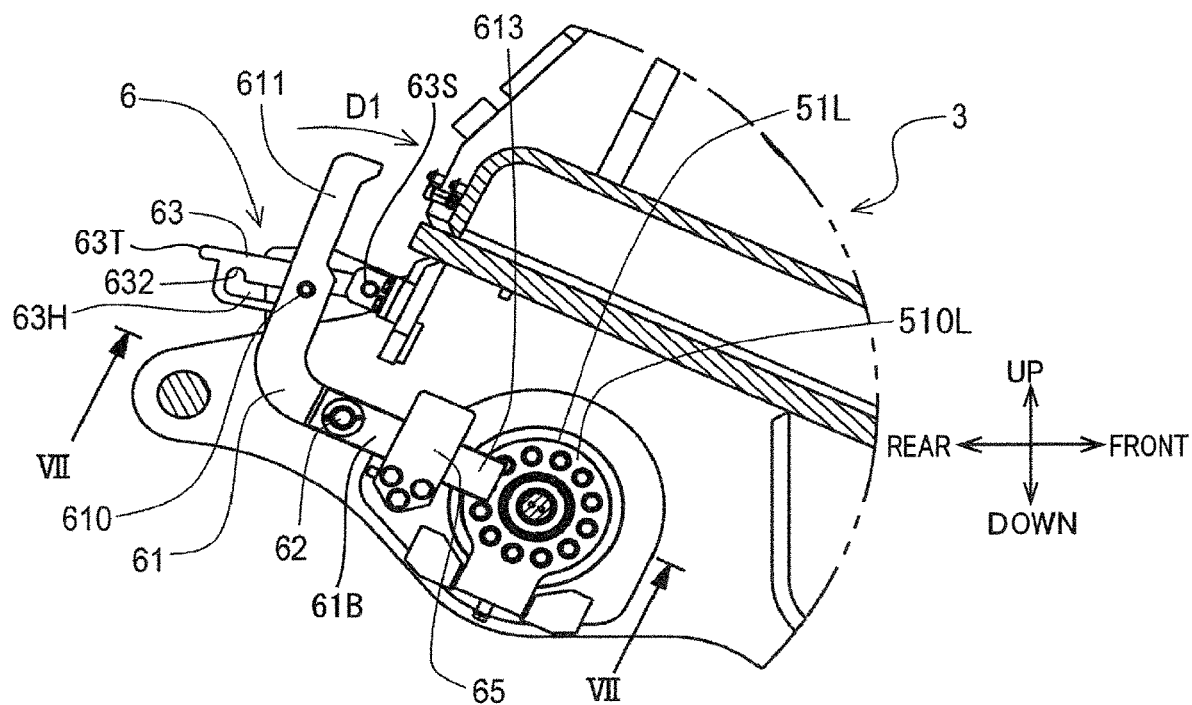
FIG. 6 is a side cross-sectional view of the movement prevention mechanism in FIG. 4 viewed along an arrow VI, and showing a state where the abutting member is switched to the abutting position.
Figure 7:
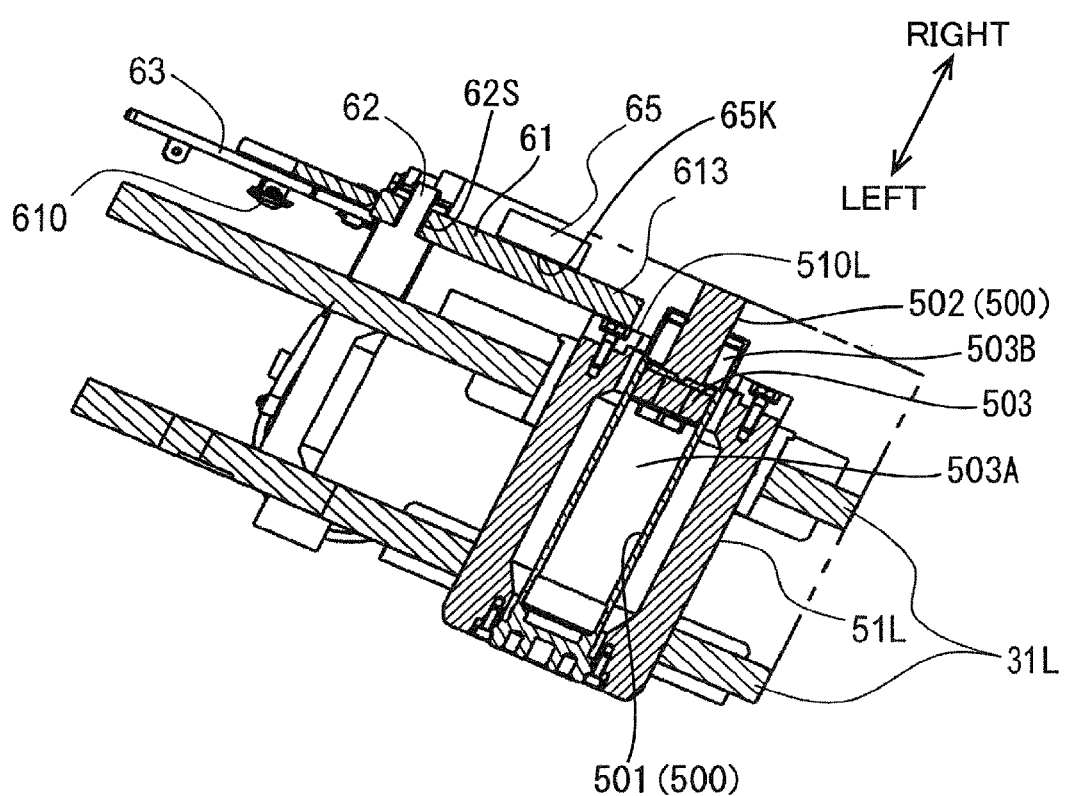
FIG. 7 is a cross-sectional view of the movement prevention mechanism in FIG. 6 taken along line VII-VII.
Figure 8:
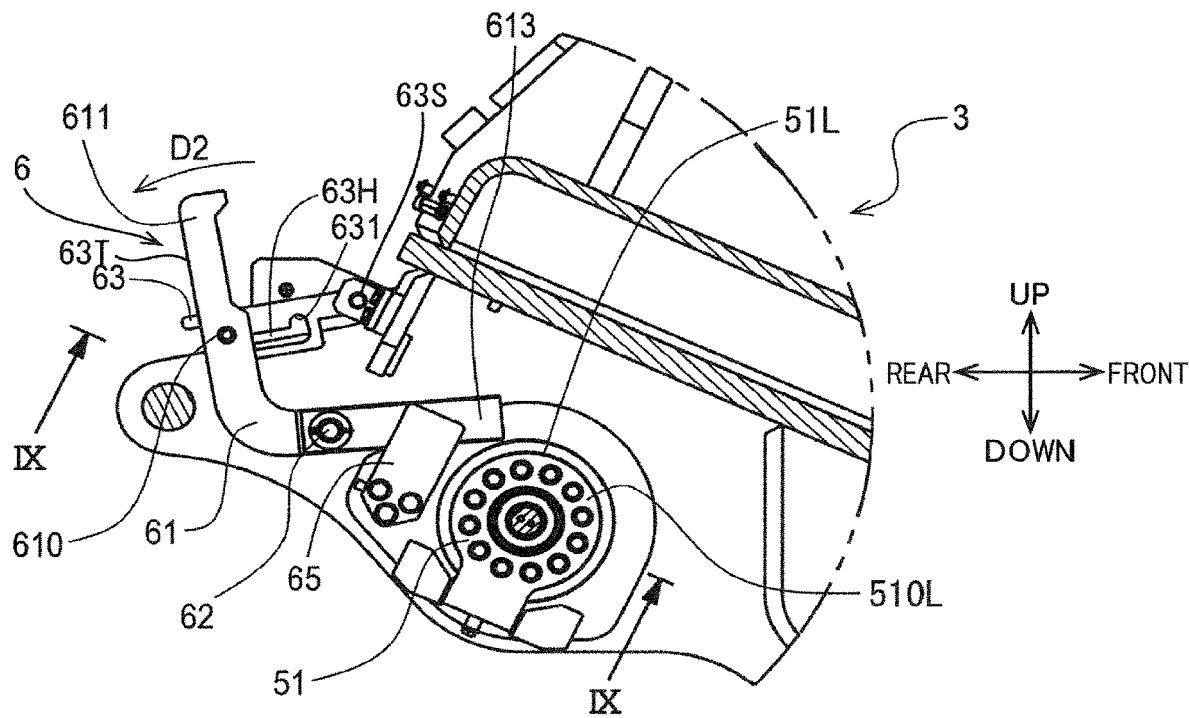
FIG. 8 is a side sectional view showing a state in which an abutting member of the movement prevention mechanism shown in FIG. 6 is switched to a non-abutting position.
Figure 9:
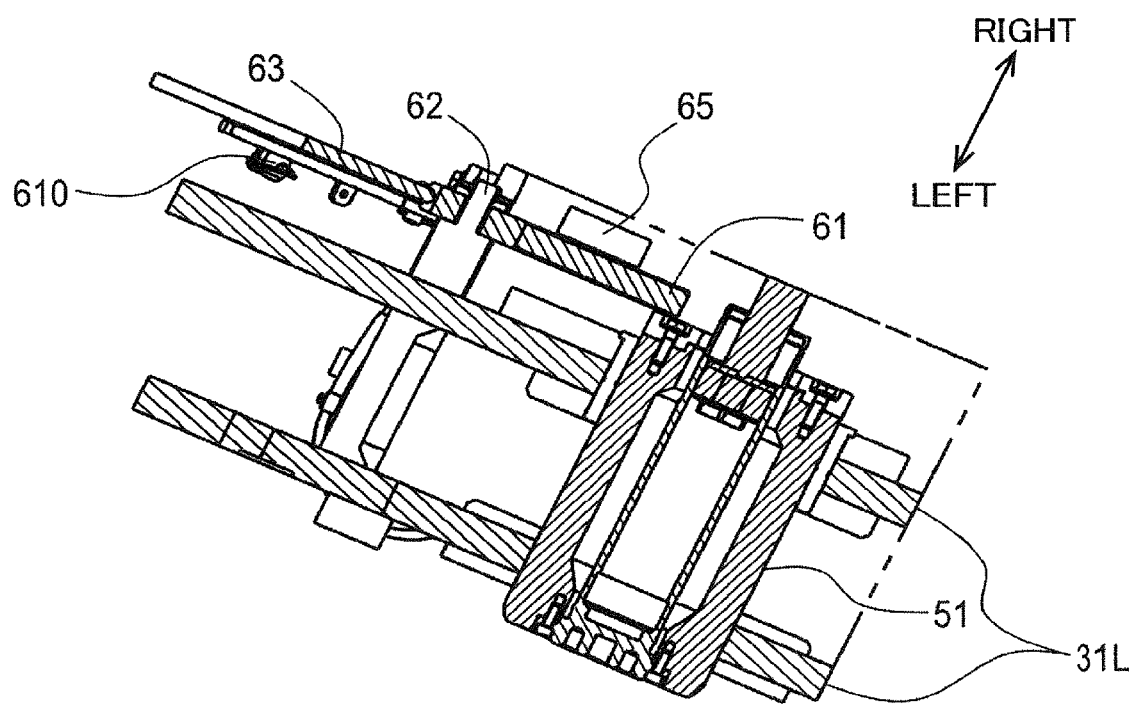
FIG. 9 is a cross-sectional view of the movement prevention mechanism taken along line IX-IX in FIG. 8.

FIG. 4 is a perspective view of a coming-off prevention mechanism 6 (movement prevention mechanism) disposed opposite to a rear-side connecting pin 51L of the hydraulic shovel 10 according to the present embodiment. FIG. 5 is a perspective view of the coming-off prevention mechanism 6 in FIG. 4 viewed along an arrow V. FIG. 6 is a side cross-sectional view of the coming-off prevention mechanism 6 in FIG. 4 viewed along the arrow VI, and is a side cross-sectional view showing the state where a coming-off prevention lever 61 is switched to the abutting position. FIG. 7 is a cross-sectional view taken along line VII-VII of the coming-off prevention mechanism 6 of FIG. 6. FIG. 8 is a side sectional view showing a state in which the coming-off prevention lever 61 of the corning-off prevention mechanism 6 shown in FIG. 6 is switched to a non-abutting position. FIG. 9 is a cross-sectional view of the coming-off prevention mechanism 6 in FIG. 8 taken along line IX-IX.

Referring to FIG. 2, the connecting pins 53L, 53R are supported by the upper frame 1 so as to advance and retract (move) along the left-right direction between the forward position (connecting position) and the retracted position (non-connecting position) by receiving predetermined power, respectively, and connect the upper frame 1 and the sub-frame 3 to each other. The forward position is a position where the connecting pins 53L, 53R are inserted into the pin holes 131L, 313 L and the pin holes 131R, 131R, respectively, and the upper frame 1 (vertical plates 13L, 13R) and the sub-frame 3 (side plates 31L, 31R) are connected to each other. The retracted position is a position where the connecting pins 53L, 53R are arranged in the retract space S on the inside (the machine center line side and the distal end side in the retracting direction) than the vertical plates 13L, 13R in the left-right direction, and the connection between the upper frame 1 and the sub-frame 3 is released. In the retracted position, the connecting pins 53L and 53R are separated from at least the pin holes 313L, 313 R (the second pin hole) in the left-right direction (retract direction), and are arranged in the retract space S inside in the left-right direction than the side plates 31L, 31R (the vertical plates 13, 13R).

In this embodiment, the hydraulic shovel 10 has four hydraulic cylinders 500 (FIG. 7) which are arranged inside the connecting pins 53L, 53R of FIG. 2 and the connecting pins 51L and 51R of FIG. 3, respectively, and expand and contract by receiving hydraulic pressure. The structure (power) of the hydraulic cylinder 500 inside the connecting pin 511 will be described below with reference to FIG. 7. The structure of the other connecting pins is similar to that of the connecting pin 51L.

The hydraulic cylinder 500 (FIG. 7) has a cylinder body 501 and a cylinder rod 502 relatively moving with respect to the cylinder body 501. The connecting pin 51L has a cylindrical shape, and the distal end of the connecting pin 51L is closed while its base end is opened. The cylinder body 501 is inserted into the connecting pin 51L from the base end of the connecting pin 51L and is fixed to the connecting pin 51L. As a result, the connecting pin 51L and the cylinder body 501 are integrally moved. On the other hand, the cylinder rod 502 has a piston portion 503 which is disposed at the tip of the cylinder rod 502 and partitions the inside of the cylinder body 501 into the head-side chamber 503A and the rod-side chamber 503B. Although not shown in FIG. 7, the base end on the opposite side of the piston portion 503 of the cylinder rod 502 is fixed to a fixing portion 50 (FIG. 2) fixed to the upper frame 1. Accordingly, the cylinder rod 502 is held by the upper frame 1 without moving integrally with the connecting pin 51L. When the hydraulic oil is supplied from the hydraulic circuit (not shown) to the head-side chamber 503A and the hydraulic fluid is discharged from the rod-side chamber 503B, the connecting pin 51L moves to the outside in the left-right direction together with the cylinder body 501. As a result, the connecting pin 51L moves from the retracted position (non-connecting position) to the forward position (connecting position). On the other hand, when the hydraulic oil is supplied from the hydraulic circuit (not shown) to the rod-side chamber 503B and the hydraulic oil is discharged from the head-side chamber 503A, the connecting pin 51L moves to the inside in the left-right direction together with the cylinder body 501 and is disposed in the retract space S. As a result, the connecting pin 51L moves from the forward position (the connecting position) to the retracted position (non-connecting position). The power for moving each connecting pin is not limited to the hydraulic structure as described above, and each connecting pin may be moved by electric power or manual operation.

In FIG. 2, the connecting pin 53L received the power similarly stated above moves from the machine center side toward the left side of the machine, and inserted into the pin hole 131L formed in the vertical plate 13L and the pin hole 313L formed on the side plate 31L sequentially. Similarly, the connecting pin 53R moves from the machine center side toward the right side of the machine, and inserted into the pin hole 131R formed in the vertical plate 13R and the pin hole 313R formed in the right side plate 31R sequentially.

On the other hand, the rear parts of the side plates 31L and 31R of the sub-frame 3 composed of the two plate members are arranged so as to sandwich the center upper parts of the vertical plates 13L, 13R of the upper frame 1 composed of one plate member. At this time, the positions of the pin holes 311L, 311R feinted at the rear of the side plates 31L and 31R are adjusted to be positioned (matched, aligned in the left and right directions) at the same axis as the pin holes 133L and 133R formed at the center upper part of the vertical plates 13L and HR.

Referring to FIG. 3, the connecting pins 51L and 51R are each capable of advancing and retracting along the right and left direction between a forward position and a retracted position, and connecting the upper frame 1 and the sub-frame 3 to each other. At the forward position, the connecting pins 51L and 51R are inserted into the pin holes 311L, 133L and the pin holes 311R, 133R, respectively, and the upper frame 1 and the sub-frame 3 are connected to each other. In the retracted position, as shown in FIG. 3, the connecting pins 51L, 51R are arranged between the side plates 31L and 31R and the machine center line in the left-right direction, and the connection between the upper frame 1 and the sub-frame 3 is released. In the retracted position, the connecting pins 51L and 51R are detached from at least the pin holes 133L and 133R, respectively, and are arranged in the retract space S inside than the vertical plates 13L, 13R in the left-right direction.

The connecting pin 51L is moved from the machine center side toward the left side of the machine by receiving the aforementioned power, and inserted into the pin hole 311L formed on the side plate 31L and the pin hole 133L formed in the vertical plate 13L sequentially. Similarly, the connecting pin 51R moves from the machine center side toward the right side of the machine, and inserted into the pin hole 311R formed on the side plate 31R and the pin hole 133R formed in the vertical plate 13R sequentially.

According to the above procedure, the upper frame 1 and the sub-frame 3 are connected. The upper frame 1 and the sub-frame 3 are one example of the first member and the second member according to the present invention.

As described above, the connecting pins 51L, 51R, 53L, 53R connecting the upper frame 1 and the sub-frame 3 to each other may be retracted against the intention of the operator due to an erroneous operation or a hydraulic trouble, or the like. In this case, the connection state between the upper frame 1 and the sub-frame 3 is released against the intention of the operator.

Therefore, in this embodiment, the coming-off prevention mechanism 6 (see FIGS. 4-9) of the connecting pins 51L and 51R are provided in the sub-frame 3. The coming-off prevention mechanism 7 (see FIGS. 10 to 13) of the connecting pins 53L, 53R is provided in the upper frame 1.

First, while referring to FIGS. 4 to 9, the coming-off prevention mechanism 6 (movement prevention mechanism) provided in the connecting pins 51L and 51R on the rear end side will be described. The coming-off prevention mechanism 6 has substantially the same configuration with respect to the connecting pins 51L and 51R. For this reason, the coming-off prevention mechanism 6 provided in the left connecting pin 51L will be described below. The coming-off prevention mechanism 6 is capable of preventing the connecting pin 51L disposed at the forward position (connecting position) from moving to the retracted position (non-connecting position).

The connecting pin 51L has an inner end surface 510 L (abutted surface) (FIG. 6 and FIG. 7) intersecting (orthogonal to) the left-right direction and disposed adjacent to the retract space S (FIG. 3). The inner end surface 510L is disposed so as to face the retracting direction (inside of the left-right direction) of the connecting pin 51L. The inner end surface 510L is not limited to those arranged on the base end surface of the connecting pin 51L, but a cut-out portion (not shown) may be formed in the central portion in the axial direction of the outer peripheral surface of the connecting pin 51L, so that an abutted surface instead of the inner end surface 510L may be formed.

As shown in FIGS. 4 and 5 the coming-off prevention mechanism 6 has a coming-off prevention lever 61 (abutting member), a switching member 63 (locking member), and a support member 65.

The coming-off prevention lever 61 includes an abutting portion 613 that can abut on the inner end surface 510L of the connecting pin 51L, and the abutting portion 613 is supported by the sub-frame 3 so as to be selectively movable between the abutting position and the non-abutting position. The abutting position (FIG. 4, FIGS. 6 and 7) is a position in which the abutting portion 613 faces the inner end surface 5101, in the left-right direction on the inner side (distal end side in the retracting direction) of the connecting pin 51L in the left-right direction, and in which the abutting portion 613 abuts on the inner end surface 510L to prevent the connecting pin 51L from moving from the forward position to the retracted position. On the other hand, the non-abutting position (FIGS. 8 and 9) is a position in which the abutting portion 613 is spaced radially outward from the inner end surface 510L of the connecting pin 51L, and in which the abutting portion 613 allows the connecting pin 51L to move from the forward position to the retracted position in the left-right direction.

The coming-off prevention lever 61 has a fulcrum portion 62S, the abutting portion 613, and an operated portion 611. The fulcrum portion 62S is a hole provided in the substantially central portion of the corning-off prevention lever 61, and is fitted on a rotating shaft 62 (FIG. 7) provided in the sub-frame 3. As a result, the fulcrum portion 62S is supported by the sub-frame 3 so as to be rotatable about a rotation center axis extending in the left-right direction. The abutting portion 613 extends in one direction orthogonal to the left-right direction from the fulcrum portion 62S. On the other hand, the operated portion 611 extends in another direction orthogonal to the left-right direction and different from the one direction from the fulcrum portion 62S, and can be operated by an operator. As a result, as shown in FIGS. 4 and 6, the coming-off prevention lever 61 is an L-shaped member in a side view and is an example of a coming-off prevention member according to the present invention.

The coming-off prevention lever 61 is rotatable around the rotating shaft 62 so that the abutting portion 613 moves between the abutting position and the non-abutting position with the operation supplied to the operated portion 611 by the operator. The abutting position is a position in which the abutting portion 613 of the coming-off prevention lever 61 is disposed in the moving path of the connecting pin 51L between the forward position and the retracted position, and interferes with the connecting pin 51L moving from the forward position to the retracted position. On the other hand, the non-abutting position is a position in which the abutting portion 613 of the coming-off prevention lever 61 is disposed outside the moving path of the connecting pin 51L and allows the connecting pin 51L to move from the forward position to the retracted position.

The operated portion 611 has a grip part 61A (FIG. 4) which can be gripped by an operator, and a projection-like slide member 610 (projecting portion) (FIG. 5) which is projected from the grip part 61A in the left-right direction. The slide member 610 of the operated portion 611 is inserted into a long hole 63H (see FIGS. 4 and 5), which will be described later. The slide member 610 slides in the long hole 63H as the operated portion 611 is operated.

The switching member 63 (lock member) can lock (fix) the coming-off prevention lever 61 at respective positions of the abutting position and the non-abutting position.

The switching member 63 is supported by the sub-frame 3 so that its base end 63S (FIG. 6) is rotatable about a rotational center axis extending in the left-right direction. The switching member 63 is formed of the mentioned long hole 63H extending in a direction orthogonal to the left-right direction. The long hole 63H receives the slide member 610 along the left-right direction. The long hole 63H allows the slide member 610 to slide along the long hole 6311 as the rotation of the coming-off prevention lever 61 around the rotational center axis in a state in which the slide member 610 is inserted in the long hole 63H. At both ends of the long hole 63H, a cutout portion 631 (see FIG. 8) (a first cutout portion, a first fitting portion) and a cutout portion 632 (see FIG. 6) (a second cutout portion, a second fitting portion) for the slide member 610 fitting in are formed (connected), respectively. The cutout portion 631 communicates with one end of the long hole 63H, and can lock the coming-off prevention lever 61 to the abutting position by being fitted to the slide member 610. On the other hand, the cutout portion 632 communicates with the other end opposite to the one end of the long hole 63H, and can lock the coming-off prevention lever 61 to the non-abutting position by being fitted to the slide member 610. The switching member 63 further includes a gripping protrusion 63T (FIG. 6). The gripping protrusion 63T is a portion that the operator grips to operate the switching member 63.

As shown in FIGS. 6 and 7 from the state shown in FIG. 8, when the operator operates the operated portion 611 in the direction D1, the slide member 610 slides along the long hole 63H and fits into the cutout portion 631. Since the slide member 610 has been fitted into the cutout portion 632 in advance, the operator grips the gripping protrusion 63T and turns the switching member 63 upward. As a result, the slide member 610 is easily removed from the cutout portion 632. When the slide member 610 is fitted into the cutout portion 631, the abutting portion 613 is disposed at the abutting position, and when the connecting pin 51L is erroneously retracted, the abutting portion 613 abuts on the inner end surface 510L of the connecting pin 51L to prevent the connecting pin 51L from coming off. In this case, the abutting portion 613 is arranged so as to enter the moving locus of the connecting pin 51L.

On the other hand, as shown in FIGS. 8 and 9 from the state shown in FIG. 6, when the operator operates the operated portion 611 in the direction D2, the slide member 610 slides along the long hole 63H and fits into the cutout portion 632. In this case, since the slide member 610 has been fitted into the cutout portion 631 in advance, the operator grips the gripping protrusion 63T and turns the switching member 63 upward. As a result, the slide member 610 is easily removed from the cutout portion 631. When the slide member 610 is fitted into the cutout portion 632, the abutting portion 613 is arranged at the non-abutting position, and when the connecting pin 51L retracts, the abutting portion 613 allows the connecting pin 51L to come off without abutting on the inner end surface 5101, of the connecting pin 51L.

The support member 65 is a member for supporting the coming-off prevention lever 61 (abutting portion 613) at the abutting position (the position shown in FIG. 6). As shown in FIG. 4, the width dimension (thickness) of the coming-off prevention lever 61 on the side of the abutting portion 613 is set to be larger than the width dimension on the side of the operated portion 611, and the coming-off prevention lever 61 is rotated from the non-abutting position to the abutting position along the direction D1 (see FIG. 6) with its own weight around the rotating shaft 62 due to the difference in the width dimension. The coming-off prevention lever 61 rotated in the direction D1 by its own weight is supported and stopped by the support member 65. That is, the support member 65 is configured to stop and support the coming-off prevention lever 61 reaching the abutting position after rotating in the direction D1. As described above, the relative position between the center of gravity of the coming-off prevention lever 61 and the rotating shaft 62 is set so that the coming-off prevention lever 61 rotates toward the abutting position around the rotating shaft 62 by its own weight.

The support member 65 has a first support surface 65J (FIG. 4) and a second support surface 65K (FIG. 7). The first support surface 65J is a surface capable of supporting the abutting portion 613 disposed at the abutting position from below. The second support surface 65K is disposed so as to intersect (orthogonal) with the first support surface 65J, and support the abutting portion 613 in the left-right direction when the abutting portion 613 of the coming-off prevention lever 61 abuts on the inner end surface 510L of the connecting pin 51L. As shown in FIG. 7, when the operating oil leaks from the head-side chamber 503A while the connecting pin 51L is disposed at the forward position (the connecting position), the connecting pin 51L tends to move toward the retracted position. In this case, the abutting portion 613 of the corning-off prevention lever 61 abuts on the inner end surface 510L of the connecting pin 51L to prevent the connecting pin 51L from coming off. The second support surface 65K of the support member 65 further supports the rear surface of the abutting portion 613. Therefore, even when vibration or external force is applied in a direction in which the connecting pin 51L goes out during the work of the hydraulic shovel 10 or the like, the connecting pin 51L can be stably prevented from coming off by the abutting portion 613, and deformation and damage of the coming-off prevention lever 61 including the abutting portion 613 by external force received from the connecting pin 51L are prevented.

As described above, the coming-off prevention lever 61 abuts on the inner end surface 510L of the connecting pin 51L to prevent the connecting pin 51L from coming off from the pin hole 311L with the retract of the connecting pin 51L. The switching member 63 also locks the coming-off prevention lever 61 to a abutting position (see FIGS. 6 and 7) in which the abutting portion 613 abuts on the inner end surface 510L when the connecting pin 51L retracts, and a non-abutting position (see FIGS. 8 and 9) in which the abutting portion 613 does not abut on the inner end surface 510L when the connecting pin 51L retracts. The support member 65 supports the coming-off prevention lever 61 rotated by its own weight at the abutting position.

Next, while referring to FIGS. 10 to 13, the coming-off prevention mechanism 7 provided on the connecting pins 53L, 53R on the front end side will be described. The coming-off prevention mechanism 7 has substantially the same configuration for each of the connecting pins 53L and 53R. For this reason, the coming-off prevention mechanism 7 provided in the right connecting pin 53L will be described below.

Figure 11:
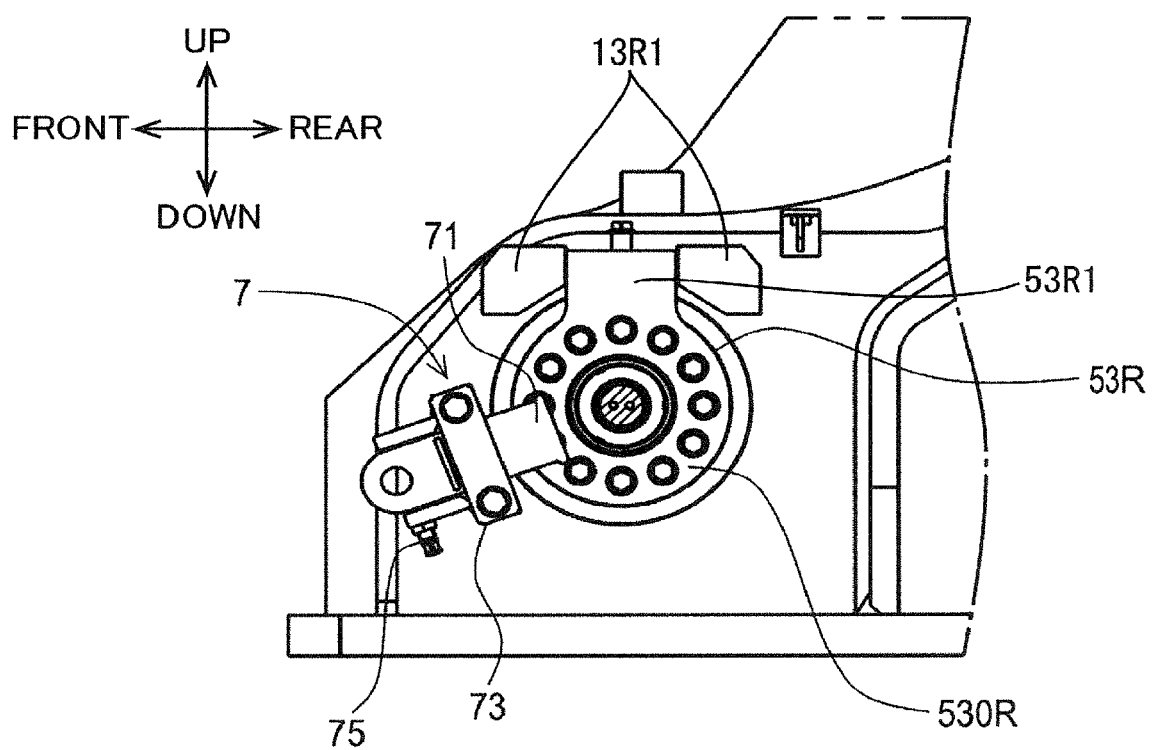
FIG. 11 is a side cross-sectional view of the movement prevention mechanism in FIG. 10 viewed along an arrow XI.
Figure 12:
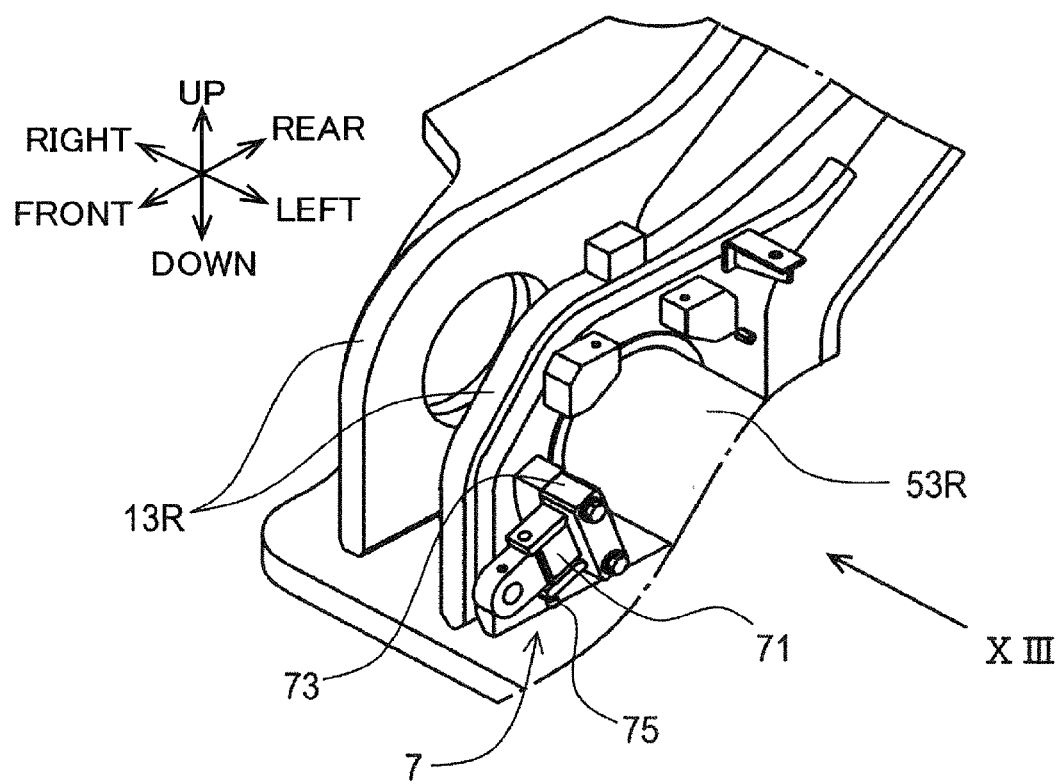
FIG. 12 is a perspective view showing a state in which the abutting member of the movement prevention mechanism shown in FIG. 10 is switched to a non-abutting position.
Figure 13:
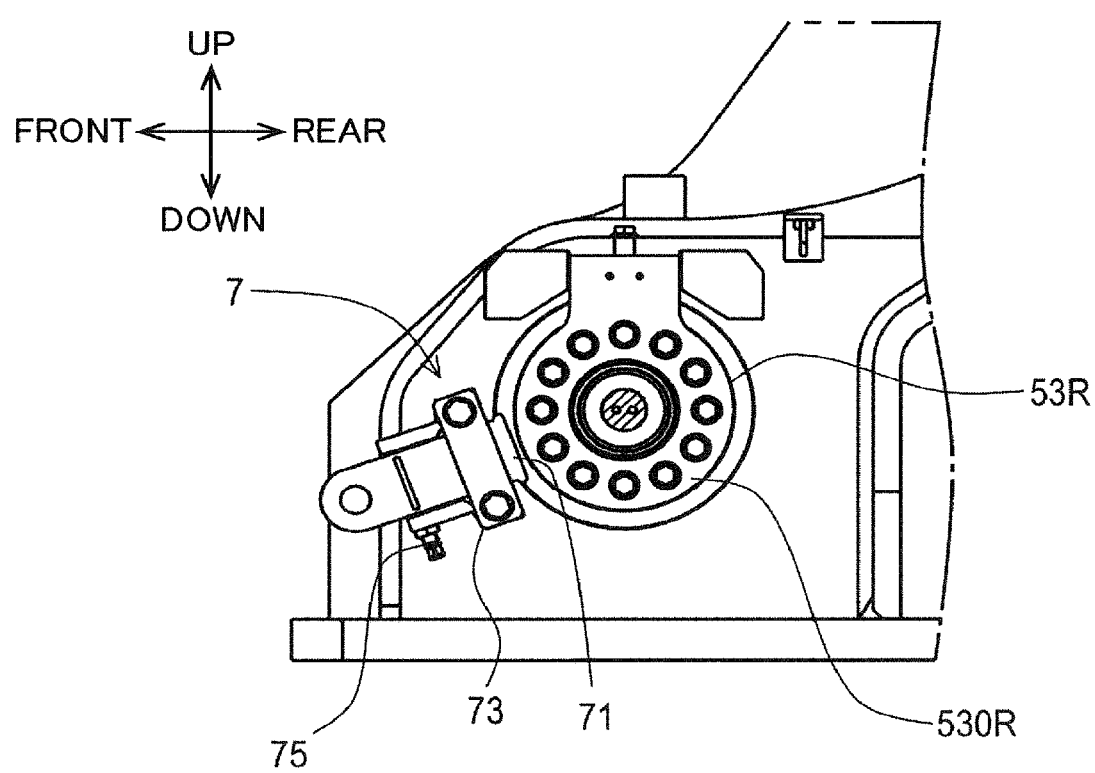
FIG. 13 is a side cross-sectional view of the movement prevention mechanism in FIG. 12 taken along an arrow XIII.

FIG. 10 is a perspective view of the coming-off prevention mechanism 7 disposed opposite to the connecting pin 53R on the front side of the hydraulic shovel 10 according to the present embodiment, and is a perspective view showing a state in which a coming-off prevention plate 71 is switched to the abutting position. FIG. 11 is a side cross-sectional view of the coming-off prevention mechanism 7 in FIG. 10 viewed along an arrow XI. FIG. 12 is a perspective view showing a state in which the coming-off prevention plate 71 of the coming-off prevention mechanism 7 shown in FIG. 10 is switched to a non-abutting position. FIG. 13 is a side cross-sectional view of the coming-off prevention mechanism 7 in FIG. 12 viewed along an arrow XIII.

As shown in FIGS. 10 and 11, the coming-off prevention mechanism 7 (movement prevention mechanism) has the coming-off prevention plate 71 (abutting member), an insertion member 73 (guide member), and a fixing bolt 75 (lock member).

The coming-off prevention plate 71 is a member for preventing the connecting pin 53R from coming-off from the pin holes 131R (FIG. 2) and 313R (FIG. 3) with the retract of the connecting pin 53R by abutting on the inner end surface 530R of the connecting pin 53R.

The insertion member 73 is a member for slidably supporting the coming-off prevention plate 71 in a state in which the coming-off prevention plate 71 is inserted. The insertion member 73 is a member capable of guiding the coming-off prevention plate 71 between the abutting position and the non-abutting position. The insertion member 73 is fixed to the inner surface of the inner vertical plate 13R. The abutting position and the non-abutting position are the same as in the case of the switching member 63 described above.

The fixing bolt 75 is a bolt for selectively fixing the coming-off prevention plate 71 to one of an abutting position (see FIGS. 10 and 11) in which the coming-off prevention plate 71 abuts on the inner end surface 530R and a non-abutting position (see FIGS. 12 and 13) in which the coming-off prevention plate 71 is not in contact with the inner end surface 530R when the connecting pin 53R retracts.

In case of preventing the connecting pin 53R from coming off, as shown in FIGS. 10 and 11, the coming-off prevention plate 71 is fixed to a position (abutting position), by a fixing bolt 75, in which the coming-off prevention plate 71 comes into contact with the inner end surface 530R of the connecting pin 53R with the retract of the connecting pin 53R.

In case of allowing the connecting pin 53R to come off, as shown in FIGS. 12 and 13, the coming-off prevention plate 71 is fixed to a position (non-abutting position), by a fixing bolt 75, in which the connecting pin 53R is not in contact with the inner end surface 530R of the connecting pin 53R with the retract of the connecting pin 53R.

The connecting pin 53R has a projecting portion 53R1 (FIG. 10, FIG. 11) projecting radially outward at the base end portion thereof. On the other hand, a pair of rotation prevention members 13R1 is fixed to the inner surface of the inner vertical plate 13R of the vertical plates 13R. When the connecting pin 53R is disposed at the forward position (the connecting position), the projecting portion 53R1 is sandwiched and held between the pair of rotation prevention members 13R1, and the connecting pin 53R is prevented from rotating. Similar structures are also provided for other connecting pins.

According to this embodiment, as shown in FIGS. 6 to 9, the coming-off prevention lever 61 of the connecting pin 51L is rotated around the rotating shaft 62 to be switched to the abutting position (FIGS. 6 and 7) and the non-abutting position (FIGS. 8 and 9). Therefore, when the connecting pin 51L is prevented from coming off, a tool (a bolt, a driver or the like) is not required. Further, the coming-off prevention lever 61 and the switching member 63 are integrally formed, and there is no fear of losing the component. Therefore, the coming-off prevention mechanism 6 according to the present embodiment is superior in workability as compared with a conventional one.

In this embodiment, the coming-off prevention lever 61 comes into contact with the inner end surface 510L of the connecting pin 51L to prevent the connecting pin 51L from coming off. Therefore, the connecting pin 51L is disposed at a position where the operator can operate from a relatively safe place above the machine even when another structure such as a cab exists on the forward end (outside of the first direction, the left side of the machine, the distal end side) of the connecting pin 51L. Therefore, the work for preventing the connecting pin 51L from coming off is prevented from being obstructed by the structure, and the workability of the operator can be improved. In particular, as shown in FIG. 7, since the coining-off prevention lever 61 is supported on the inner side surface of the inner side plate 31L (the first connecting portion), even if another structure is disposed around the tip portion of the connecting pin 51L of FIG. 7, the coming-off preventing operation can be easily performed. Although the coming-off prevention lever 61 may be supported on the outside surface of the inner side plate 31L, it is preferable that the coming-off prevention lever 61 is supported by the upper frame 1 or the sub-frame 3 at the inside (distal end side in the retracting direction) in the left-right direction from the viewpoint of the workability of the operator when the connecting pin 51L is prevented from coming off.

Further, in this embodiment, as shown in FIG. 6, the coming-off prevention lever 61 rotates in the direction D1 with its own weight around the rotating shaft 62, and the coming-off prevention lever 61 rotated in the direction D1 by its own weight is supported by the support member 65. Therefore, even if the lock of the coming-off prevention lever 61 by the switching member 63 is released against the intention of the operator, the abutting portion 613 of the coming-off prevention lever 61 can be maintained at the lock position (the safety side for preventing the connecting pin from coming off).

According to this embodiment, as shown in FIGS. 10 and 11, the coming-off prevention plate 71 abuts on the inner end surface 530R of the connecting pin 53R to prevent the connecting pin 53R from coming off. Therefore, even if a structure such as a cab exists on the forward end (the left side of the machine and the tip side) of the connecting pin 533, the coming-off prevention mechanism 7 is arranged at a position where the operator can operate from a relatively safe place above the machine, so that the workability of the operator can be improved.

The connecting pin coming-off prevention structure (movement prevention mechanism) of the construction machine according to the present invention is not limited to the above-described embodiment, and various modifications and improvements are possible within the scope of the appended claims.

In the above embodiment, the connecting pins 51L, 51R, 53L and 53R for connecting the upper frame 1 and the sub-frame 3 of the hydraulic shovel 10 are exemplified by the case where the connecting pin retaining structure (movement preventing mechanism) according to the present invention is applied, but the present invention is not limited thereto. For example, in a work attachment of a construction machine composed of a plurality of booms, a connecting pin coming-off prevention structure according to the present invention may be applied to a connecting pin for connecting the booms to each other. In this case, one boom of the plurality of booms constitutes the first member of the present invention, and the other boom constitutes the second member of the present invention. The coming-off prevention mechanisms 6, 7 are preferably arranged for all of the connecting pins 51L, 51R, 53L, 53R, but may be disposed on at least one of the connecting pins 51L and 51R, and at least one of the connecting pins 53L and 53R.

In the above embodiment, the case where the coming-off prevention mechanism 6 shown in FIGS. 4 to 9 is provided in the sub-frame 3 is exemplified, but the coming-off prevention mechanism 6 may be provided on the upper frame 1.

In the above-described embodiment, while one-plate second connecting portion is inserted between the two-plate first connecting portions, the first connecting portion and the second connecting portion may be composed of one plate or a plurality of plates.

As described above, the configuration according to the present invention is suitable for preventing the connecting pin for connecting the two members from corning off.

Provided by the present invention is a construction machine, comprising: a first member having a first connecting portion adjacent to a retract space formed in the construction machine, the first connecting portion being formed of a first pin hole opened toward the retract space and penetrating the first connecting portion in a first penetration direction, a second member having a second connecting portion disposed at a position opposite to the retract space across the first connecting portion, the second connecting portion being formed of a second pin hole penetrating the second connecting portion in a second penetration direction at a position aligned with the first pin hole in the first penetration direction, a connecting pin supported by the first member or the second member so as to be movable within a range between a connecting position and a non-connecting position, the connecting position being a position in which the connecting pin is inserted into the first pin hole and the second pin hole to connect the first member and the second member to each other, and the non-connecting position being a position to which the connecting pin moves in a retract direction in which the connecting pin is retracted from the connecting position to the retract space along the first through direction and the second penetration direction to release the connection between the first member and the second member, and a movement prevention mechanism capable of preventing the connecting pin disposed at the connecting position from moving to the non-connecting position in the retract direction, wherein the connecting pin has an abutted surface disposed so as to face the retracting direction, the movement prevention mechanism includes an abutting member having an abutting portion capable of abutting the abutted surface of the connecting pin and is supported by the first member or the second member on the distal end side of the retract direction relative to the second connecting portion so that the abutting portion can move between an abutting position and a non-abutting position, the abutting position being a position in which the abutting portion is disposed so as to face the abutted surface on the tip side in the retracting direction relative to the abutted surface, and the abutting portion abuts on the abutted surface to prevent the connecting pin from moving from the connecting position to the non-connecting position in the retracting direction, and the non-abutting position is a position in which the abutting portion moves in a direction intersecting the retract direction so as to be separated from the abutted surface and allows the connecting pin to move from the connecting position to the non-connecting position.

According to this configuration, the connecting pin is supported by the first member or the second member so as to be movable in a range between a connecting position and a non-connecting position which is disposed in the distal end side in the retract direction than the connecting position, and the connecting pin does not move in a direction opposite to the retract direction from the connecting position. Further, since the abutting member capable of preventing the connecting pin from moving from the connecting position to the non-connected position is supported by the first member or the second member on the distal end side in the retracting direction than the second connecting portion, even if the other structure of the construction machine such as a cab or the like is disposed on the opposite side of the second connecting portion in the retracting direction, work for preventing the connecting pin from coming off by the abutting member is not hindered by the structure, and the construction machine excellent in the workability of the work can be provided.

In the above configuration, it is desirable that the abutting member is supported by the first member or the second member so as to be away from the abutting portion in a direction intersecting the retract direction and rotatable about a rotation center axis extending in the retract direction, and is rotatable around the rotation center axis so that the abutting portion moves between the abutting position and the non-abutting position.

According to this configuration, by rotating the abutting member around the rotational center axis, the abutting portion can be easily moved between the abutting position and the non-abutting position, and the connecting pin can be prevented from coming off.

In the above-described configuration, it is desirable that the abutting member further includes an operated portion which is disposed away from the abutting portion in a direction intersecting the retracting direction and can be operated by an operator, and the abutting member can be rotated around the rotational center axis with an operation supplied to the operated portion so that the abutting portion moves between the abutting position and the non-abutting position.

According to this configuration, by rotating the abutting member around the rotation center axis by operating the operated portion by the operator, the abutting portion can be easily moved between the abutting position and the non-abutting position, and the connecting pin can be prevented from coming off.

In the above configuration, it is desirable to further comprise a lock member supported by the first member or the second member and capable of locking the abutting portion to respective positions of the abutting position and the non-abutting position.

According to this configuration, the abutting portion can be stably held at the abutting position and the non-abutting position by the lock member.

In the above configuration, it is desirable to further comprise a lock member supported by the first member or the second member and capable of locking the abutting portion to respective positions of the abutting position and the non-abutting position, wherein the abutting member has: a fulcrum portion disposed away from the abutting portion in a direction intersecting the retract direction and supported by the first member or the second member so as to be rotatable about a rotation center axis extending in the retracting direction: an operated portion disposed away from the abutting portion and the fulcrum portion in a direction intersecting the retract direction respectively, and capable of being operated by an operator, and a projecting portion disposed on the operated portion so as to protrude from the operated portion in the retracting direction, the abutting member can be rotated around the rotational center axis with an operation supplied to the operated portion so that the abutting portion moves between the abutting position and the non-abutting position, the lock member is formed of a long hole, a first cutout portion and a second cutout portion, the long hole extends in a direction orthogonal to the retracting direction and receiving the projecting portion along the retracting direction, and allows the projecting portion to move along the long hole as the rotating of the abutting member around the rotation center axis, the first cutout portion communicates with one end part of the long hole and is capable of locking the abutting portion to the abutting position by being fitted to the projecting portion, and the second cutout portion communicates with the other end part of the long hole opposite to the one end part and capable of locking the abutting portion to the non-abutting position by being fitted to the projecting portion.

According to this configuration, the abutting portion can be easily locked to the abutting position or the non-abutting position in succession to the operation of the operator rotating the abutting member around the rotational center axis.

In the above configuration, it is desirable that the abutting member is configured to rotate from the non-abutting position toward the abutting position around the rotation center axis by its own weight, and the movement prevention mechanism further includes a support member capable of supporting the abutting portion of the abutment member reaching the abutting position by the rotation.

According to this configuration, even when the lock member is unlocked by the vibration or the like of the construction machine in a state where the abutting member is disposed at the abutting position, the abutting member can be returned to the abutting position by its weight of the abutting member. Further, the support member can stably support the abutting member at the abutting position.

In the above configuration, it is desirable that the support member includes: a first supporting surface capable of supporting the abutting portion disposed at the abutting position from below, and a second supporting surface arranged so as to intersect the first supporting surface and capable of supporting the abutting portion along the retract direction from the side opposite to the abutted surface.

According to this configuration, even when the abutting portion receives a large force along the retracting direction from the abutted surface of the connecting pin, the second supporting surface of the support member can support the abutting portion from the side opposite to the abutted surface, so that deformation and damage of the abutting member including the abutting portion can be suppressed.

The invention claimed is:
1. A construction machine, comprising:
a first member having a first connecting portion adjacent to a retract space formed in the construction machine, the first connecting portion being formed of a first pin hole opened toward the retract space and penetrating the first connecting portion in a first penetration direction,
a second member having a second connecting portion disposed at a position opposite to the retract space across the first connecting portion, the second connecting portion being formed with a second pin hole penetrating the second connecting portion in a second penetration direction at a position aligned with and on a same axis as the first pin hole in the first penetration direction,
a connecting pin supported by the first member or the second member so as to be movable within a range between a connecting position and a non-connecting position, the connecting position being a position in which the connecting pin is inserted into the first pin hole and the second pin hole to connect the first member and the second member to each other, and the non-connecting position being a position to which the connecting pin moves in a retract direction in which the connecting pin is retracted from the connecting position to the retract space along the first penetration direction and the second penetration direction to release the connection between the first member and the second member to disassemble the first member and the second member from each other, and
a movement prevention mechanism capable of preventing the connecting pin disposed at the connecting position from moving to the non-connecting position in the retract direction,
wherein:
the connecting pin has an abutted surface disposed so as to face in the retract direction,
the movement prevention mechanism includes an abutting member having an abutting portion capable of abutting the abutted surface of the connecting pin and is supported by the first member or the second member on a distal end side in the retract direction relative to the first and second connecting portions so that the abutting portion can move between an abutting position and a non-abutting position, the abutting position being a position in which the abutting portion is disposed so as to face the abutted surface on the distal end side in the retract direction relative to the abutted surface, and the abutting portion abuts on the abutted surface to prevent the connecting pin from moving from the connecting position to the non-connecting position in the retract direction, and the non-abutting position is a position in which the abutting portion moves in a direction intersecting the retract direction so as to be separated from the abutted surface and allows the connecting pin to move from the connecting position to the non-connecting position, and
the abutting member is supported by the first member or the second member so as to be away from the abutting portion in a direction intersecting the retract direction and rotatable about a rotation center axis extending in the retract direction, and is rotatable around the rotation center axis so that the abutting portion moves between the abutting position and the non-abutting position.
2. The construction machine according to claim 1, wherein:
the abutting member further includes an operated portion which is disposed away from the abutting portion in a direction intersecting the retract direction and can be operated by an operator, and the abutting member can be rotated around the rotational center axis with an operation supplied to the operated portion so that the abutting portion moves between the abutting position and the non-abutting position.

3. The construction machine according to claim 1, further comprising a lock member supported by the first member or the second member and capable of locking the abutting portion to respective positions of the abutting position and the non-abutting position.

4. A construction machine, comprising:

a first member having a first connecting portion adjacent to a retract space formed in the construction machine, the first connecting portion being formed of a first pin hole opened toward the retract space and penetrating the first connecting portion in a first penetration direction, a second member having a second connecting portion disposed at a position opposite to the retract space across the first connecting portion, the second connecting portion being formed with a second pin hole penetrating the second connecting portion in a second penetration direction at a position aligned with the first pin hole in the first penetration direction, a connecting pin supported by the first member or the second member so as to be movable within a range between a connecting position and a non-connecting position, the connecting position being a position in which the connecting pin is inserted into the first pin hole and the second pin hole to connect the first member and the second member to each other, and the non-connecting position being a position to which the connecting pin moves in a retract direction in which the connecting pin is retracted from the connecting position to the retract space along the first penetration direction and the second penetration direction to release the connection between the first member and the second member, and a movement prevention mechanism capable of preventing the connecting pin disposed at the connecting position from moving to the non-connecting position in the retract direction, wherein:

the connecting pin has an abutted surface disposed so as to face the retract direction, the movement prevention mechanism includes an abutting member having an abutting portion capable of abutting the abutted surface of the connecting pin and is supported by the first member or the second member on a distal end side in the retract direction relative to the first and second connecting portion so that the abutting portion can move between an abutting position and a non-abutting position, the abutting position being a position in which the abutting portion is disposed so as to face the abutted surface on the distal end side in the retract direction relative to the abutted surface, and the abutting portion abuts on the abutted surface to prevent the connecting pin from moving from the connecting position to the non-connecting position in the retract direction, and the non-abutting position is a position in which the abutting portion moves in a direction intersecting the retract direction so as to be separated from the abutted surface and allows the connecting pin to move from the connecting position to the non-connecting position, the construction machine further comprising a lock member supported by the first member or the second member and capable of locking the abutting portion to respective positions of the abutting position and the non-abutting position, wherein:

the abutting member has:

a fulcrum portion disposed away from the abutting portion in a direction intersecting the retract direction and supported by the first member or the second member so as to be rotatable about a rotation center axis extending in the retract direction;

an operated portion disposed away from the abutting portion and the fulcrum portion in a direction intersecting the retract direction respectively, and capable of being operated by an operator, and a projecting portion disposed on the operated portion so as to protrude from the operated portion in the retract direction, the abutting member can be rotated around the rotational center axis with an operation supplied to the operated portion so that the abutting portion moves between the abutting position and the non-abutting position, the lock member is formed with a long hole, a first cutout portion and a second cutout portion, the long hole extends in a direction orthogonal to the retract direction and receiving the projecting portion along the retract direction, and allows the projecting portion to move along the long hole as the abutting member is rotated around the rotation center axis, the first cutout portion communicates with one end part of the long hole and is capable of locking the abutting portion in the abutting position by being fitted to the projecting portion, and the second cutout portion communicates with the other end part of the long hole opposite to the one end part and is capable of locking the abutting portion in the non-abutting position by being fitted to the projecting portion.

5. The construction machine according to claim 4, wherein:

the abutting member is configured to rotate from the non-abutting position toward the abutting position around the rotation center axis by its own weight, and the movement prevention mechanism further includes a support member capable of supporting the abutting portion of the abutment member upon reaching the abutting position by the rotation.

6. The construction machine according to claim 5, wherein:

the support member includes:

a first supporting surface capable of supporting the abutting portion disposed at the abutting position from below, and a second supporting surface arranged so as to intersect the first supporting surface and capable of supporting the abutting portion along the retract direction from the side opposite to the abutted surface.

* * * * *